C. ANSPACH.
AIR BRAKE FOR VEHICLES.
APPLICATION FILED APR. 15, 1910.
999,732.
Patented Aug. 8, 1911.
2 SHEETS—SHEET 1.
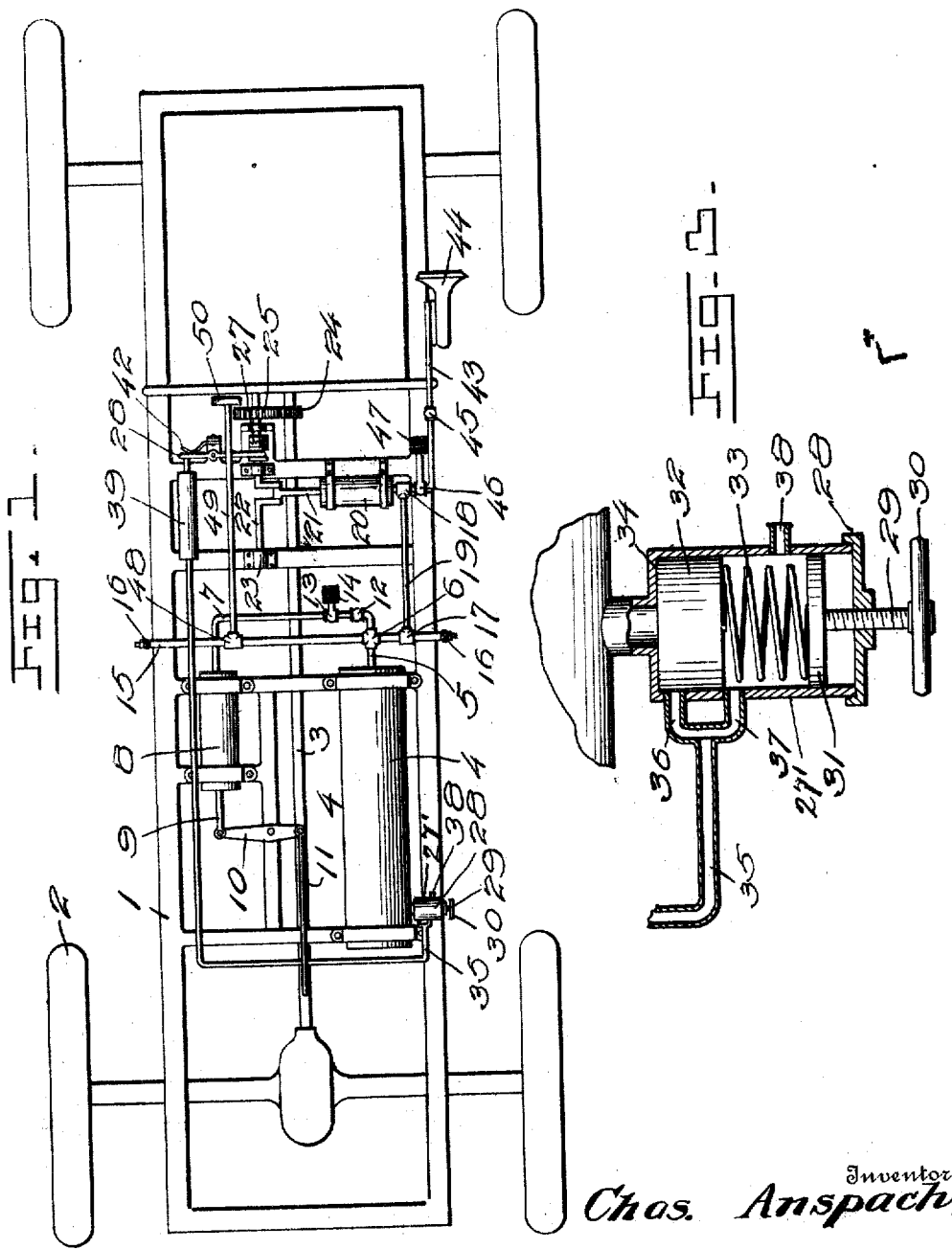
Witnesses
Inventor
Chas. Anspach,
By Woodward & Chandlee
Attorneys

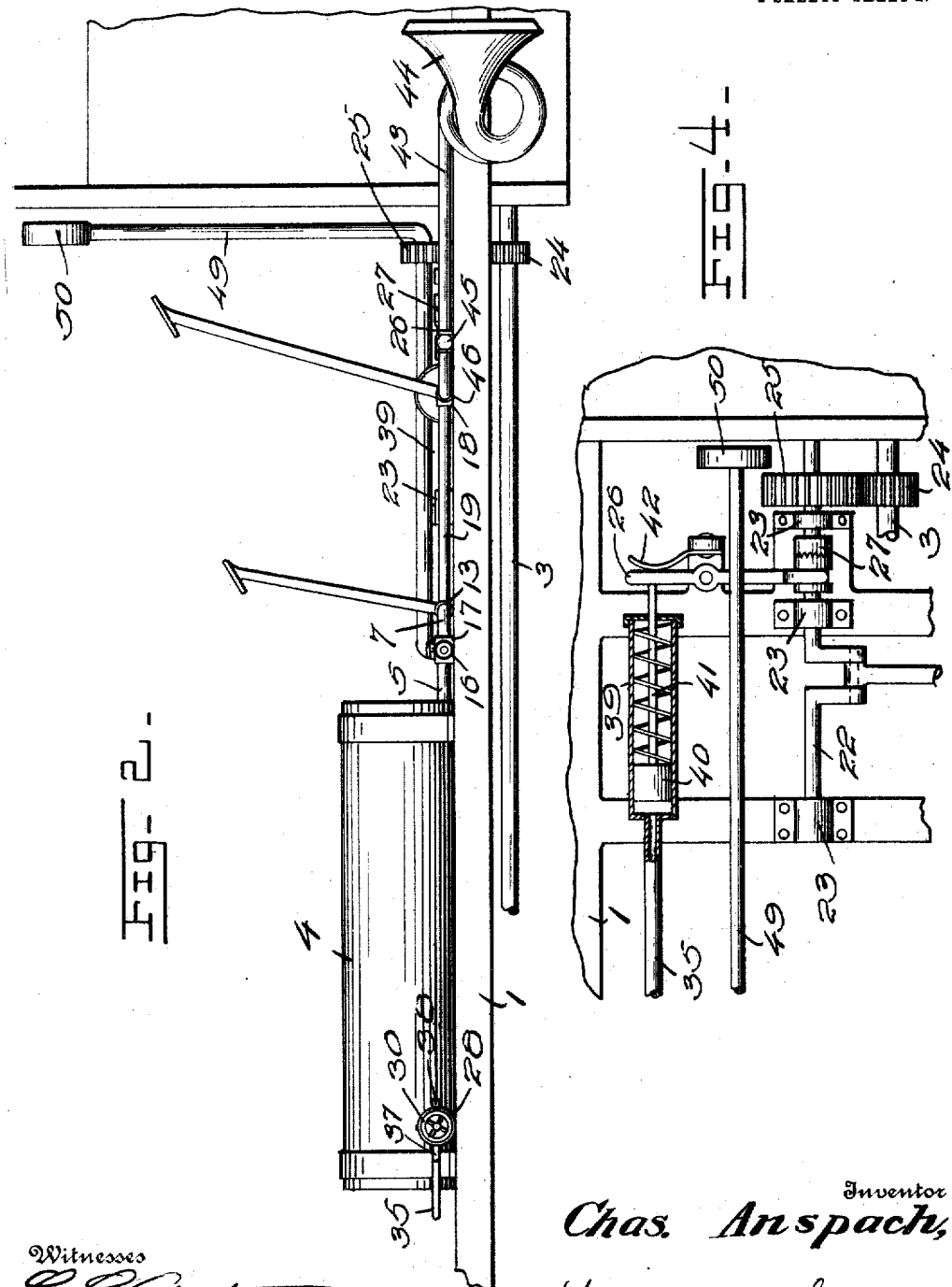

UNITED STATES PATENT OFFICE.

CHARLES ANSPACH, OF AMHERST, NEBRASKA.

AIR-BRAKE FOR VEHICLES.

999,732.　　　　　Specification of Letters Patent.　　Patented Aug. 8, 1911.

Application filed April 15, 1910.　Serial No. 555,568.

*To all whom it may concern:*

Be it known that I, CHARLES ANSPACH, a citizen of the United States, residing at Amherst, in the county of Buffalo and State of Nebraska, have invented certain new and useful Improvements in Air-Brakes for Vehicles, of which the following is a specification.

This invention relates to an improvement in air brakes for vehicles, and more particularly adapted for automobiles wherein compressed air may be advantageously used for various purposes.

The object of the invention is to construct and arrange a very practical and effective combination of parts which may be properly and readily attached to an automobile frame, whereby a continuous and substantially uniform air pressure is maintained at all times without attention on the part of the operator.

A further object of the invention is to supply and arrange the parts in such a manner in respect to one another that the air thus stored may be employed in a very practical manner for setting the brakes, inflating the tires of the wheels of the automobile and sounding a horn or signal, and any other usages to which stored air may be used to advantage.

The invention therefore consists in the employment of a drive shaft of the automobile as the motive power for driving an air pump to introduce air pressure in a storage tank or reservoir, and delivered to a cylinder for operating the brakes when desired, to provide means whereby the air pump is automatically thrown out of operation when the air pressure reaches a certain degree in the reservoir, said means also operating to cause the air pump to be set in motion when the pressure in the reservoir drops below a certain degree, and various other connections leading from the reservoir for connecting the compressed air so stored to various devices for the purpose previously described, the compressed air thus conducted also being under perfect control of the operator.

Other objects and advantages will be apparent from the following description and it will be understood that changes in the specific structure shown and described may be made within the scope of the claims without departing from the spirit of the invention.

In the drawings: Figure 1 is a top plan view of the complete invention properly mounted upon an automobile frame. Fig. 2 is a side view of the same. Fig. 3 is a longitudinal section of the automatic pump regulator. Fig. 4 is a longitudinal section of the auxiliary shaft which is rotated by the drive shaft of the automobile.

Referring to the drawings, 1 represents an automobile frame of any well known construction mounted upon wheels 2 and having a longitudinal drive or power shaft 3 journaled to the frame in any suitable and mechanical manner, to which frame and power shaft carried thereby the invention is readily and mechanically applied.

Mounted upon the frame 1 at any suitable position thereon is a storage tank or reservoir 4, from one end of which leads a pipe 5, entering and connected to a four way coupling 6, and leading from the latter and extending at right angles to the said tank is a compressed air supply pipe 7, which leads to and is properly connected in any suitable and mechanical manner to one end of an ordinary brake cylinder 8, having the usual piston rod 9 projecting from the opposite end of said cylinder.

Movably mounted upon the frame 1 of the automobile or any other stationary part thereof is a brake equalizing lever 10, the end of the long arm of which is hingedly attached to the forked terminal end of the piston rod 9, projecting from the brake cylinder 8, and also hingedly secured to the opposite or short arm of the lever 10 is one end of a connecting rod 11, which is connected to and coöperates with the ordinary brakes of an automobile or clutches thereof forming the brake mechanism, all of which is of the well known construction.

Located at any convenient position along the compressed air supply pipe 7 is a valve 12, and also positioned along said pipe at a suitable distance from the valve is a spring actuated cut-off valve 13, which is operated or depressed by a foot lever 14, whereby compressed air may be admitted to the brake cylinder 8, from the storage tank or reservoir 4, when it is desired to apply the brakes or clutches of the automobile, the supply of air being regulated entirely by the foot of the operator depending upon the distance the foot lever 14 is depressed.

Rigidly fixed to the frame 1 of the machine, and passing transversely across the same is a pipe 15, the opposite terminal ends of which are provided with hand regulating valves 16 having projecting nipples to which are adapted to be secured a suitable pipe for supplying compressed air to the tires of the wheels of the machine when it is desired to inflate the same, said pipe so employed being removably attached for such purposes. Located adjacent to one of the valves 16 of the pipe 15, is a three way coupling 17, and connecting said coupling with a similar coupling 18 is a pipe 19 for supplying air to the reservoir 4 from the air compressor or pump 20, which is also rigidly fixed to the frame 1 of the machine. The air compressor or pump 20 is provided with the usual reciprocating piston rod 21 and having its free end movably secured to a crank shaft 22 mounted upon suitable bearings 23, also fixed to the frame 1, said crank shaft being of the usual construction for reciprocating the piston rod 21 and intermittently or continuously compressing air to be conducted and stored within the reservoir 4 for the various other purposes hereinafter to be described.

To the main drive or power shaft 3 is secured a pinion 24, and meshing with the same is a gear wheel 25, which is keyed or otherwise secured to the auxiliary crank shaft 22, whereby motion is imparted to the latter when the automobile is propelled, or said crank shaft can be rotated while the machine is in a standing position by throwing the transmission of the engine in neutral, for pumping air directly into the tires of the wheels, should there not be sufficient pressure within the tank or reservoir. Also movably secured to the frame 1 of the machine and properly positioned in respect to the crank shaft 22, is a lever 26, one end of which engages in the usual manner with an ordinary clutch mechanism 27 carried upon the shaft 22, whereby when the lever is operated in one direction the said shaft will remain stationary and the piston 21 of the pump or air compressor 20 remain at rest, but when said lever is moved in the opposite direction the clutch mechanism will be operated or caused to engage in such a manner as to revolve the crank shaft 22 by the gear wheel 25 and pinion 24 in a manner previously described, the mechanism for actuating the lever 26 in the two directions referred to will be hereinafter described.

Secured to the storage tank or reservoir 4 and in communication therewith and positioned at any point along its length is an automatic pump regulator 27' which is cylindrical in form and having a closed top 28 with a screw threaded aperture passing therethrough which is adapted to receive the screw threaded stem 29, the outer end of which is provided with a hand wheel 30, which is adapted to be grasped by the hand of the operator for adjusting the stem within the cylinder. The inner end of the screw threaded stem 29, is provided with a circular head 31, which freely moves within the cylinder and interposed between said head and a cylindrical valve block or plug 32, is a coil spring 33, which holds said block against the lower end or seat 34 forming the lower end of the cylinder 27' the hand wheel 30 and screw threaded stem 29, together with the head 31 located within the cylinder operating to properly adjust the required tension upon the coil spring 33 for holding the block 32 in its closed or normal position over the opening leading from the tank or reservoir 4 to said automatic pump regulator.

Leading from one side of the automatic pump regulator and in communication therewith is the forked end of a compressed air supply pipe 35, whereby two ports 36 and 37 are provided which freely communicate with the said supply pipe 35, one of said ports being located adjacent to the lower end of the regulator and the other port 37 in communication with the regulator above the block 32 when the latter is in its normal or closed position, and projecting from the cylinder 27' forming the casing of the regulator is a port 38 which allows the air to escape when said block is in its closed position.

Located in close proximity to the outer projecting end of the lever 26 is a cylinder 39, which is secured to the frame work of the machine and within which is slidingly located a piston 40 having a stem 41 projecting through one end of said cylinder and coöperating with the said end of the lever 26 in a manner hereinafter to be described, a coil spring being located in said cylinder, surrounding said stem and interposed between one wall of the cylinder and the head 40 forming the end of the stem, whereby the latter is held in its normal position or is retracted when the compressed air is prevented from passing into the supply pipe 35 by the automatic pump regulator. Bearing against the opposite surface of the free end of the lever 26 adjacent to its end is a spring 42 which holds the lever 26 in its normal position for causing the pump or air compressor to be continuously operated until the pressure of air within the tank or reservoir becomes excessive or above the required degree of pressure, in which instance the stem 41 will be operated and forced against the opposite side of the lever 26 and causing the latter to be sufficiently moved to throw the clutch mechanism 27 out of gear and the piston 21 of the air compressor to be retarded or held stationary.

Leading from the coupling 18 is a branch pipe 43, the terminal end of which is provided with a horn, whistle, or other signal device adapted to be operated by compressed air. Also located within the branch pipe 43 leading to the horn 44, is a spring actuated valve 46, which is adapted to be depressed by a foot lever 47 for opening said valve and permitting air to pass through the pipe and the horn or other signaling device, all of which is under the perfect control of the operator.

Located within the air supply pipe 15 at a suitable and convenient position along its length is a coupling 48 to which is connected a pipe 49, passing through the body of the car, or more properly the bottom thereof, and carrying a gage 50 for determining the pressure of the compressed air within the reservoir 4 at all times.

From the foregoing description it will be seen that when the drive shaft 3 is rotated in the usual manner, the pinion 24 will be likewise rotated, which in turn rotates the gear wheel 25, and crank shaft 22 providing the clutch mechanism 27 is in an engaging position, in which operation the pitman 21 of the pump or air compressor 20 will be reciprocated causing compressed air to flow or to be forced through the pipe 19, and into the transverse pipe 15 and tank or reservoir 4, where it is stored for immediate use and application to the various parts as heretofore described.

Should the pressure of the compressed air within the reservoir 4 become excessive or beyond the intended pressure for all practical purposes, the plug 32 of the automatic pump regulator will be moved from its seat or normal position closing the port 37 and opening the port 36, in which operation the air conducting pipe 35 will be furnished with compressed air from the regulator and operating the stem 41 or forcing the same into direct contact with the outer free end of the lever 26, whereby the clutch mechanism 27 will be disengaged and the crank shaft 22 caused to become stationary, furnishing no further air for the reservoir. When the pressure in the reservoir 4 decreases below the intended pressure the plug 32 will again assume its normal or closed position allowing the air contained within the pipe 35 to escape through the port 37 over the plug 32 and through the exit escape port 38 into the atmosphere, in which operation the valve stem 41 will assume its normal position and the clutch mechanism 27 be brought into an engaging position for operating the pitman 21 of the pump or air compressor 20 by the rotation of the shaft 22 and its coöperating mechanism previously referred to.

The remaining features and operation of the various parts for controlling the compressed air to the same, will be readily understood from the preceding description.

What is claimed is:

1. In an air brake apparatus for vehicles, a suitable tank or reservoir, an automatic pump regulator communicating with said reservoir, a piston located within said regulator and normally closing the communication between the reservoir and regulator, a screw threaded stem passing through one end of the regulator and adjustable from the outer end of said regulator, the inner end of said stem being provided with a head, a coil spring interposed between said head and plug and a suitable supply pipe leading from the regulator and provided with two ports one of which is located at the lower end of the regulator and the other beyond the plug when the latter is in its normal condition, said supply pipe being in communication with a suitable apparatus for automatically shifting the clutch mechanism of the device, as and for the purpose described.

2. The combination, in an air brake apparatus for vehicles, of a reservoir, an air pump for supplying said reservoir and provided with a pitman, a crank shaft for reciprocating the latter, suitable clutches carried upon said shaft, a lever one end of which is in movable connection with the said clutch, a cylinder located adjacent to the free end of the lever, a stem projecting from said cylinder and having a head slidingly located within the latter, a coil spring located within the cylinder encircling said stem and interposed between one end of the cylinder and the head carried by the stem, whereby the latter is located in an engaging position with respect to the outer free end of the lever for releasing the clutch, a pipe leading from the cylinder and connected to an automatic pump regulator, the latter being composed of a suitable cylinder attached to and in communication with the reservoir, a piston located within the cylinder of the regulator and normally closing the communication between the latter and the reservoir, a screw threaded stem passing through one end of the regulator, a hand operated knob secured to the outer end of the stem, a head forming the inner end of the stem, a coil spring interposed between the head and plug, said cylinder of the regulator being provided with two ports in connection with the supply pipe, one of which is above the plug located within the cylinder, and having an exit port for the escape of the air into the atmosphere, a suitable brake cylinder, means for supplying air from the latter to the reservoir, suitable brake rigging actuated by the compressed air within the brake cylinder, means for regulating the air to the brake cylinder, a transversely arranged pipe also in communication with the reservoir, the opposite ends of which are provided with valves for supplying air to the tires of the wheels of the vehicles for inflating said tires.

In testimony whereof I affix my signature, in presence of two witnesses.

CHARLES ANSPACH.

Witnesses:
 HENRY MENCKE,
 C. T. GRINNES.